UNITED STATES PATENT OFFICE 2,336,664

NITRO-ARYL AMINE SULPHONIC ACIDS OF 1,3-BENZAZOLES

Frithjof Zwilgmeyer, Wilmington, Del., assignor to E. I. du Pont de Nemours & Company, Wilmington, Del., a corporation of Delaware No Drawing. Application May 14, 1941,
Serial No. 393,483

7 Claims. (Cl. 260—304)

This invention relates to novel organic compounds which may be useful as dyestuffs for animal fiber or as intermediates for the manufacture of other dyestuffs. More particularly this invention deals with nitro-diaryl-amine-sulphonic acids of the general formula

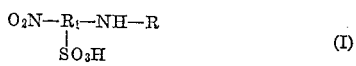

wherein $R_1$ is a radical of the benzene or naphthalene series, while R is the radical of a 1,3-benzazole compound attaching in the Bz ring. By the expression "a 1,3-benzazole compound" I mean a compound of the group consisting of benzoxazole, benzthiazole, benzimidazole, and their various derivatives obtained by substitution in the homocyclic ring, in the heterocyclic ring, or in both, including the various tautomers of these.

I have found that nitro compounds of the above general formula, beside being applicable as dyestuffs for wool per se, lend themselves readily to reduction to the corresponding amines which in turn lend themselves readily to conversion into dioxazine dyestuffs by the aid of benzoquinones their homologs and halogen derivatives, for instance chloranil. The said reduction and conversion steps per se may follow analogous procedures in the art, but I find that the resulting dyestuffs possess exceptionally good affinity for cotton, good light fastness, wash-fastness and exhaustion properties.

All these remarkable, improved qualities seem to flow directly from the nature of R in my novel group of compounds, which has been defined above as the radical of a 1,3-benzazole compound. In other words, R in Formula I above is characterized by a structure consisting of one homocyclic ring of 6 carbon atoms and one heterocyclic 5-membered ring fused together. In the case of benzoxazole, benzthiazole and benzimidazole, this ring structure may be represented by the following formula:

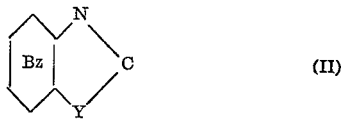

wherein Y stands for oxygen, sulphur, imino or substituted imino.

In the above ring structure (II), the C-atoms of the Bz-ring may have their extranuclear valencies satisfied by the customary auxochromic substituents such as hydrogen, halogen, lower alkyl or lower alkoxy; the N-atom shown in the above azole ring has no extranuclear valencies in one tautomeric form and carries a hydrogen atom in another tautomeric form; the C-atom of the azole ring may have the extranuclear valencies satisfied by hydrogen, OH, SH (in the enol form), O, S (in the keto form), alkyl, aryl, COOH, NH, N-alkyl, N-aryl or N-acyl; finally, the extra N-atom of the heterocyclic ring in the case of a benzimidazole may have its extra valency satisfied by hydrogen, alkyl (lower or higher) and aryl. Typical illustrations of these possible variations will be found in the table following the specific example below.

The synthesis of my novel compounds may follow in general the prior practice of the art except for the choice of R. In general, the process consists of condensing a primary amine of the form $H_2N—R$, wherein R has the same significance as above, with the selected nitro halogenaryl-sulphonic acid in the presence of an acid absorbing agent. As common agents useful for this purpose may be mentioned sodium carbonate and bicarbonate, sodium acetate, magnesium carbonate, pyridine and the like. For best results I prefer to carry out the reaction in aqueous solution or suspension in the presence of soda ash, magnesium oxide or both, at elevated temperature in an autoclave. The condensation results in the elimination of one mole of hydrogen halide between the two molecules being condensed, and in the case of 4-nitro-chlorobenzene-2-sulphonic acid, may be represented by the following equation:

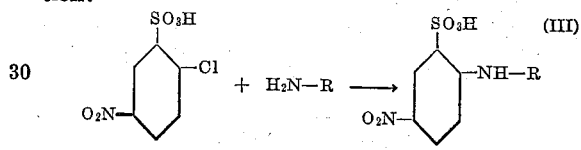

The initial amines of formula $H_2N—R$ may themselves be prepared by methods well known in the art, most of which involve reduction of the corresponding nitro compound of formula $O_2N—R$. Some are prepared synthetically from a monoacylated diamine, such as p-amino-acetanilide, which is treated with agents adapted to form the heterocyclic ring, and is then subjected to hydrolysis to split off the acyl group.

Without any intent to limit this invention, the following example is given to illustrate my preferred mode of operation. Parts mentioned are by weight.

Example 670 parts of 5-amino-benzimidazolone of the following formula

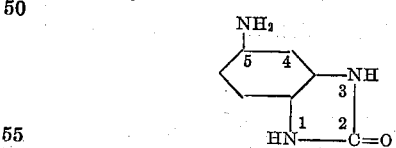

(made by reducing the corresponding nitrocompound, described in Ber. 45, 3243), 1244 parts of water, 1067 parts of paranitro-chlorobenzene-ortho-sulphonic acid are mixed together, and enough soda ash is added to make the reaction mixture slightly alkaline to Brilliant Yellow. This is followed by the addition of 88 parts of magnesium oxide, and the mass is then heated in a pressure vessel to 130 to 132° C. for 6 hours, then at 135 to 137° C. for 6 hours, and finally at 140 to 142° C. for 12 hours. The reaction mixture is now slurried in 1000 parts of additional water, made alkaline to Clayton Yellow paper with caustic soda, and filtered at 60° C.

The filtrate is acidified with an equal volume of hydrochloric acid, 20° Bé., cooled to room temperature, and the product is filtered off and dried.

The brown compound, obtained in good yield, is represented by the following formula:

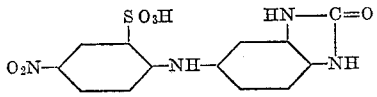

This substance dissolves readily in alkaline water solutions with a strong orange color and is again precipitated upon acidification.

In a similar manner other amino-1,3-benzazoles of formula H₂N—R may be condensed with the same or other nitro-halogen-benzene sulphonic acid, to give a corresponding nitro-diaryl-amine-sulphonic acid.

In the following table are given a number of amino-1,3-benzazoles actually used by me in various experiments, the condensation being done in each case with 4-nitro-1-chlorobenzene-2-sulphonic acid:

(1) 6-amino-5-methyl-2-benzimidazolone:

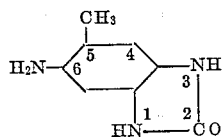

made by reducing the corresponding nitro compound obtained by nitration of 5-methyl-2-benzimidazolone, the preparation of which is described in Beilstein, 4th edition, vol. 24, page 126.

(2) 6-amino-5-chloro-2-benzimidazolone:

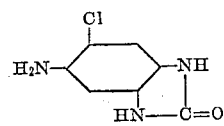

obtained by nitration of 5-chloro-2-benzimidazolone, the preparation of which is described ibidem, page 119.

(3) 6-amino-3-methyl-2-benzimidazolone:

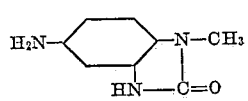

(4) 6-amino-3-phenyl-2-benzimidazolone:

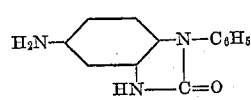

(5) 6 - amino - 3(2',5'-dichlorophenyl)-2-benzimidazolone:

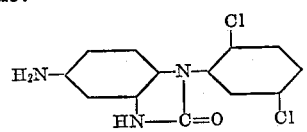

The amines Nos. 3, 4 and 5 were obtained from the corresponding nitro-N-substituted-ortho-phenylenediamines and urea, according to the method described in Journal für Prakt. Chimie, 2nd series, vol. 75, page 323.

(6) 6-amino-2-benzimidazolthione:

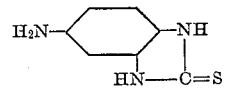

obtained from the corresponding nitro-ortho-phenylene diamine and thiourea according to ibidem, page 324.

(7) 5-amino-2-methyl benzimidazole:

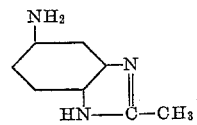

obtained from the corresponding nitro-ortho-phenylene diamine and acetaldehyde according to Berichte, vol. 27, page 2189.

(8) 6-amino-2-methyl-benzimidazole:

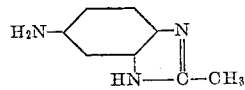

(9) 6-amino-benzimidazole:

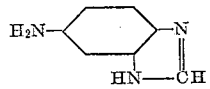

(10) 6-amino-2-phenyl-benzimidazole:

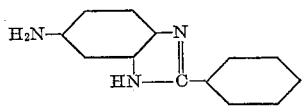

Compounds 8, 9 and 10 were obtained, respectively, by subjecting to reduction, by the aid of iron and hydrochloric acid, nitro-diacetyl-, nitro-diformyl- and nitro-di-benzoylortho-phenylene diamine, which reduction results in automatic simultaneous ring-closure.

(11) 5-amino-1,2-dimethyl-benzimidazole:

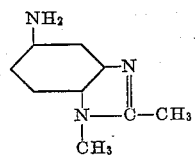

(12) 5-amino - 1 - phenyl-2-methyl-benzimidazole:

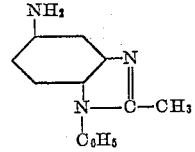

Compounds 11 and 12 were prepared by reduction and simultaneous automatic ring closure of nitro-N-methyl- or N-phenyl- (respectively) N'-acetyl-ortho-phenylene-diamine.

(13) 5-amino-2-carboxy-benzimidazole:

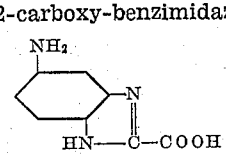

obtained by reducing the nitro compound made from nitro-ortho-phenylene diamine by heating with oxalic acid.

(14) 5-amino-2-o-chlorophenyl-benzimidazole:

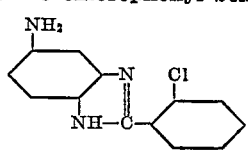

(15) 5 - amino - 2 - o - hydroxyphenyl - benzimidazole:

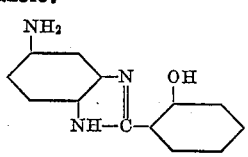

(16) 5-amino-2(2'-hydroxy-3'-carboxyphenyl)-benzimidazole:

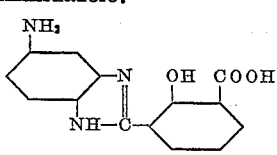

Compounds 14, 15 and 16 were obtained by reducing the corresponding nitro compounds prepared from the nitro-orthophenylene diamine with the respectively substituted benzaldehydes.

(17) 2,6-diamino-benzothiazole:

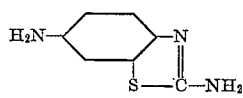

obtained from p-amino-acet-anilide by treatment with ammonium thiocyanate in glacial acetic acid, followed by ring-closure by treatment with bromine and conversion to the free aminocompound by hydrolyzing with dilute hydrochloric acid.

(18) 5-amino-6-methyl-2-acetamido-benzothiazole:

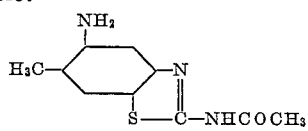

(19) 5-amino-6-chloro-2-acetamido-benzothiazole:

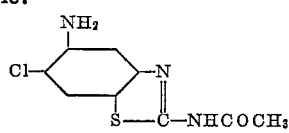

(20) 5-amino-2-acetamido-benzothiazole:

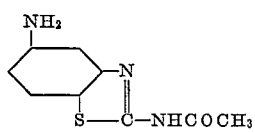

(21) 5-amino-6-ethoxy-2-acetamido-benzothiazole:

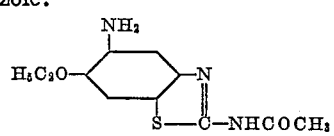

(22) 6-amino-2-acetamido-benzothiazole:

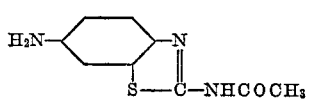

(23) 7-amino-4,6-dimethyl-2-acetamido-benzothiazole:

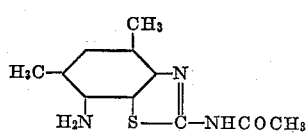

Compounds 18 to 23 were prepared by ring-closing, by the aid of bromine and glacial acetic acid, the corresponding nitro-phenyl-thioureas, which results in a nitro-2-acetyl-amino-benzothiazole, and then reducing the nitro group by the aid of iron and acid.

(24) 6-amino-benzoxazolone:

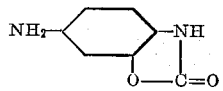

This compound was prepared by reduction of the corresponding nitro body described in Beilstein, 4th edition, vol. 27, page 181.

All the products obtained from the above amino-1,3-benzazoles after condensation with nitrochlorobenzene sulphonic acid, dissolve in alkaline water solution with a strong orange to brown color and are precipitated from their alkaline solution by acidification. They all dye wool from an acid bath in yellow to brownish shades. They are readily reduced by known methods to the corresponding amino bodies. These amino bodies may be diazotized and coupled with 2,3-hydroxynaphthoic acid anilide and similar coupling components. Their outstanding value, however, is in the synthesis of dioxazine type dyestuffs, as more fully described and claimed in my copending application, Serial No. 393,484, of even date herewith. Preferred reduction methods are iron and acid reduction, or catalytic hydrogenation.

It will be understood that the above examples are merely illustrative of the numerous intermediates obtainable according to this invention. For instance, instead of the methylated products in the above table, homologous 1,3-benzazoles having longer aliphatic chains may be used; or instead of chlorinated compounds, the corresponding brominated products may be used; and instead of using a base prepared from para-nitrochlor-benzene-ortho-sulphonic acid, other halogen-nitro-aryl-sulphonic acids of the benzene and a naphthalene series, containing an active halogen, may be used.

It will be further understood that in the above table many of the compounds are capable of existing in two tautomeric forms: enol and keto. Only one of these has been shown in the table, for convenience. But no limitation is intended, as it will be readily apparent that either form may be employed.

Many other permissible variations will be apparent to those skilled in the art.

I claim:

1. A compound of the formula

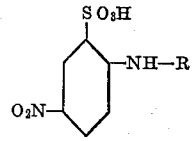

wherein R is the radical of 2-benzimidazolone attached in the Bz ring.

2. A compound of the formula

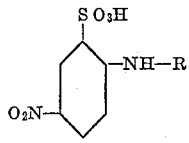

wherein R is the radical of 2-methyl-benzimidazole attached in the Bz ring.

3. A compound of the formula

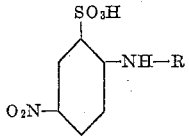

wherein R is the radical of 2-amino-benzothiazole attached in the Bz ring.

4. A compound of the formula

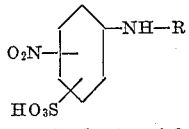

wherein R is the radical of a 1,3-benzazole compound of the group represented by the formulas

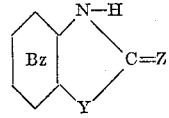

and

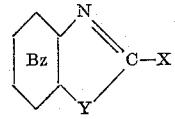

which is directly attached to the above NH group through the Bz ring, and wherein Y is a link of the group consisting of O, S, NH, N-alkyl and N-aryl; X is a monovalent substituent of the group consisting of H, OH, SH, alkyl, aryl, COOH, $NH_2$ and NH-acyl; Z is a divalent substituent of the group consisting of O, S, NH, N-alkyl and N-aryl, while the unoccupied positions of the Bz ring are satisfied by monovalent substituents of the group consisting of hydrogen, halogen, lower alkyl and lower alkoxy.

5. A compound of the formula

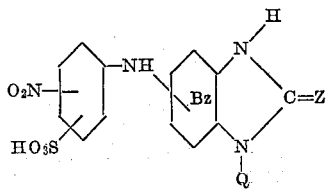

wherein Z stands for a divalent substituent of the group consisting of O, S, NH, N-alkyl and N-aryl; Q stands for a monovalent substituent of the group consisting of H, alkyl and aryl, while the remaining positions of the Bz ring are satisfied by monovalent substituents selected from the group consisting of hydrogen, halogen, lower alkyl and lower alkoxy.

6. A compound of the formula

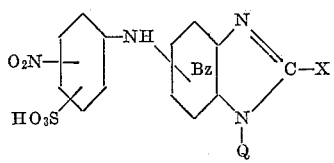

wherein X stands for a monovalent substituent of the group consisting of H, OH, SH, alkyl, aryl, COOH, $NH_2$ and NH-acyl, Q stands for a monovalent substituent of the group consisting of H, alkyl and aryl, while the remaining positions of the Bz ring are satisfied by monovalent substituents selected from the group consisting of hydrogen, halogen, lower alkyl and lower alkoxy.

7. A compound of the formula

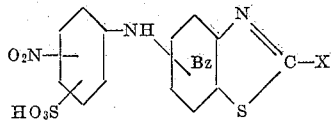

wherein X stands for a monovalent substituent of the group consisting of H, OH, SH, alkyl, aryl, COOH, $NH_2$ and NH-acyl, while the remaining positions of the Bz ring are satisfied by monovalent substituents selected from the group consisting of hydrogen, halogen, lower alkyl and lower alkoxy.

FRITHJOF ZWILGMEYER.